US009169872B2

(12) United States Patent
Sears et al.

(10) Patent No.: US 9,169,872 B2
(45) Date of Patent: Oct. 27, 2015

(54) BEARING HAVING COMPONENTS FABRICATED FROM A CERAMIC MATRIX COMPOSITE

(71) Applicant: GENERAL ELECTRIC COMPANY, Schenectady, NY (US)

(72) Inventors: James William Sears, Niskayuna, NY (US); George Hanna Ghanime, Ballston Spa, NY (US); Kenneth Lee Fisher, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 31 days.

(21) Appl. No.: 14/085,894

(22) Filed: Nov. 21, 2013

(65) Prior Publication Data

US 2015/0139582 A1     May 21, 2015

(51) Int. Cl.
*F16C 33/62* (2006.01)
*F16C 33/32* (2006.01)
*F16C 33/34* (2006.01)

(52) U.S. Cl.
CPC ............... *F16C 33/62* (2013.01); *F16C 33/32* (2013.01); *F16C 33/34* (2013.01)

(58) Field of Classification Search
CPC .......... F16C 33/62; F16C 33/32; F16C 33/34
See application file for complete search history.

(56) References Cited

U.S. PATENT DOCUMENTS

| 5,306,565 | A | 4/1994 | Corbin et al. |
| 6,099,605 | A | 8/2000 | Cook et al. |
| 6,432,885 | B1 | 8/2002 | Vollmer |
| 6,921,422 | B2 | 7/2005 | Cook et al. |
| 7,172,641 | B2 | 2/2007 | Cook et al. |
| 7,238,429 | B2 | 7/2007 | Cook et al. |
| 7,517,375 | B2 | 4/2009 | Cook et al. |
| 2008/0226897 | A1 | 9/2008 | Can et al. |
| 2010/0028641 | A1* | 2/2010 | Zhu et al. ............ 428/220 |
| 2011/0030440 | A1 | 2/2011 | Keane et al. |
| 2011/0168451 | A1 | 7/2011 | DiGiovanni et al. |
| 2012/0103697 | A1 | 5/2012 | DiGiovanni |

FOREIGN PATENT DOCUMENTS

CN      102531609      6/2013

OTHER PUBLICATIONS

Fuerst et al., "Laser Powder Deposition of AlMgB14-TiB2 Ultra-Hard Coatings on Titanium, Steel, and Cast Iron Substrates," Randall M. German Honorary Symp[osium on Sintering and Powder-Based Materials, 2012 TMS Annual Meeting & Exhibition, Mar. 11-15, 2-12.

B. A. Cook et al., "Analysis of wear mechanisms in low-friction AlMgB14-TiB2 Coatings," Surface & Coatings Technology, vol. 205, 2010, pp. 2296-2301.

(Continued)

*Primary Examiner* — Thomas R. Hannon
(74) *Attorney, Agent, or Firm* — Robert M. McCarthy

(57) ABSTRACT

Embodiments of a bearing are provided herein. In one embodiment a bearing may include a bearing assembly having an inner race and an outer race; a plurality of rolling elements disposed between the inner race and the outer race, wherein at least one of the inner race, the outer race, and the plurality of rolling elements is at least partially fabricated from an $AlMgB_{14}$ containing ceramic matrix composite.

18 Claims, 1 Drawing Sheet

(56) References Cited

OTHER PUBLICATIONS

PCT Search Report and Written Opinion issued in connection with corresponding PCT Application No. PCT/US2014/063814 on Jul. 17, 2015.

Alan et al., "Wear-Resistant Boride Nanocomposite Coating Exhibits Low Nanocomposite Coating Exhibits Low Friction", Ames Laboratory Publications and Papers, vol. No. 34, Issue No. 11, pp. 792, 2009.

* cited by examiner

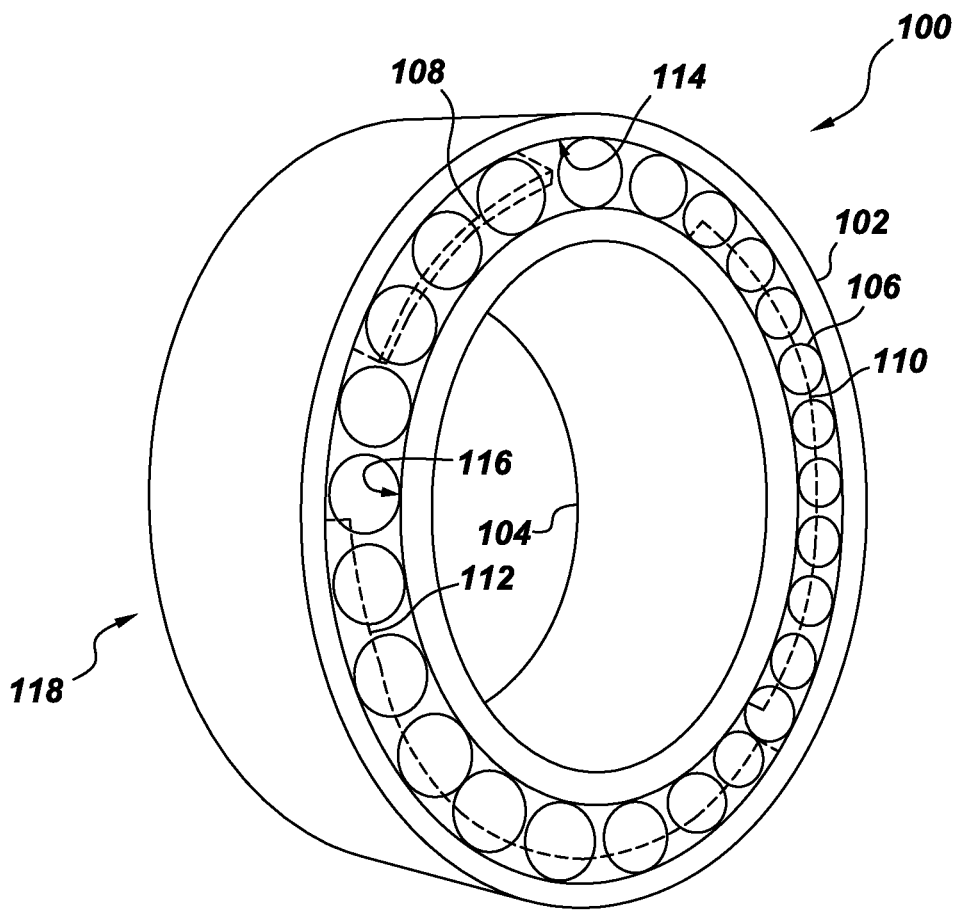
Fig. 1
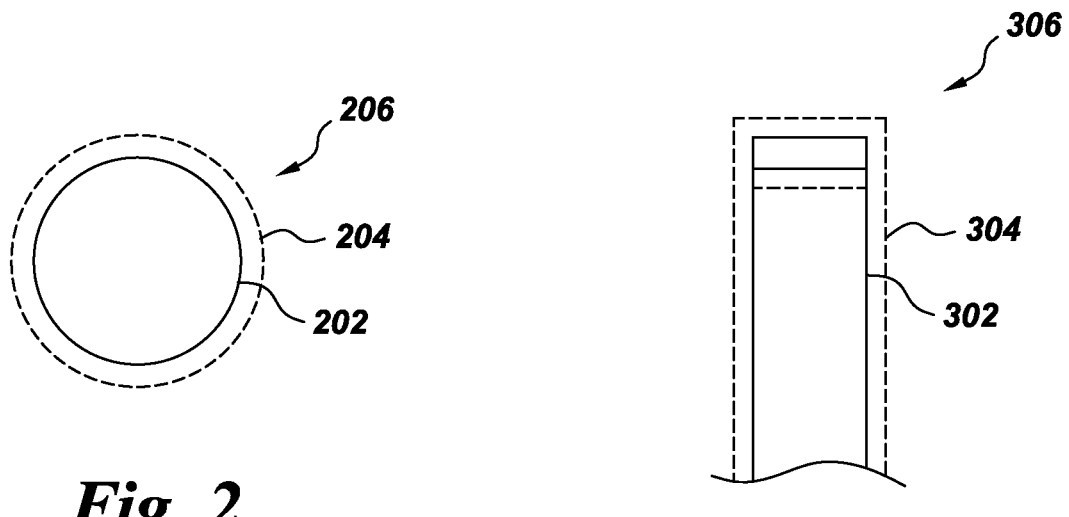
Fig. 2
Fig. 3

BEARING HAVING COMPONENTS FABRICATED FROM A CERAMIC MATRIX COMPOSITE

BACKGROUND

The subject matter disclosed herein generally relates to bearings, and more specifically, rotary and/or rolling element bearings.

Conventional bearings utilized, for example, to provide relative rotational movement between two or more objects (e.g., rotary bearings) are typically fabricated from materials having properties suitable to withstand stresses imposed on the bearing in a desired application. For example, materials exhibiting high hardness and/or toughness, for example, such as steel alloys, ceramics or the like, are conventionally utilized to fabricate one or more components of the bearings. However, the inventors have observed that in applications where components of the bearings are exposed to increased stresses (e.g., high Hertzian contact stresses), for example, aircraft or aerospace applications, such conventional materials display unacceptable amounts of deformation and/or degradation, thereby resulting in failure of the bearing.

Therefore, the inventors have provided an improved bearing having components fabricated from a ceramic matrix composite.

SUMMARY

Embodiments of a bearing are provided herein. In one embodiment a bearing may include a bearing assembly having an inner race and an outer race; and a plurality of rolling elements disposed between the inner race and the outer race, wherein at least one of the inner race, the outer race and the plurality of rolling elements is at least partially fabricated from an $AlMgB_{14}$ containing ceramic matrix composite.

In one embodiment, a bearing may include a bearing assembly having an inner race and an outer race; and a plurality of rolling elements disposed between the inner race and the outer race, wherein at least one of the inner race, the outer race and the plurality of rolling elements is a monolithic part fabricated from an $AlMgB_{14}$ containing ceramic matrix composite, wherein the $AlMgB_{14}$ containing ceramic matrix composite comprises a plurality of $AlMgB_{14}$ containing particles or fibers dispersed throughout a $TiB_2$ containing metal matrix.

The foregoing and other features of embodiments of the present invention will be further understood with reference to the drawings and detailed description.

DESCRIPTION OF THE FIGURES

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of the invention and are therefore not to be considered limiting in scope, for the invention may admit to other equally effective embodiments.

FIG. 1 is a perspective view of a bearing in accordance with some embodiments of the present invention.

FIG. 2 is a cross sectional view of a portion of a bearing in accordance with some embodiments of the present invention.

FIG. 3 is a cross sectional view of a portion of a bearing assembly of a bearing in accordance with some embodiments of the present invention.

To facilitate understanding, identical reference numbers have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of a bearing are disclosed herein. The inventive bearing comprises one or more components (e.g., bearing assembly, inner or outer race, rolling elements, or the like) that are at least partially fabricated from an aluminum-magnesium-boron ($AlMgB_{14}$, "BAM") containing ceramic matrix composite. Fabricating one or more components from the $AlMgB_{14}$ containing ceramic matrix composite advantageously provides a bearing having an improved ability to withstand stresses imposed on the bearing in high stress applications, as compared to bearings fabricated from conventionally utilized materials.

FIG. 1 is a perspective view of a bearing 100 in accordance with some embodiments of the present invention. In one embodiment, the bearing 100 generally comprises a bearing assembly 118 having an inner race 104, an outer race 102, and a plurality of rolling elements 106 disposed between the inner race 104 and the outer race 102.

The inner race 104 is disposed within, and rotates independently of, the outer race 102. In one embodiment, each of the inner race 104 and the outer race 102 may comprise a feature, for example a flange (partially shown in phantom at 110 and 112), configured to maintain the plurality of rolling elements 106 in a desired position between the inner race 104 and the outer race 102. When present, the flange 110, 112 may be a separate component coupled to the inner race 104 or outer race 102, or alternatively, formed integrally with the inner race 104 or outer race 102, thereby providing a bearing assembly 118 having a unitary design.

The plurality of rolling elements 106 contact an inner surface 114, 116 of the inner race 104 and the outer race 102 and rotate independently of each of the inner race 104 and the outer race 102, thereby minimizing friction between the inner race 104 and the outer race 102 while under load (e.g., radial and/or thrust loading), thus allowing the inner race 104 and the outer race 102 to rotate with respect to one another. The plurality of rolling elements 106 may be any type of rolling elements suitable to facilitate relative rotatable movement between the inner race 104 and the outer race 102 to form a desired type of bearing. For example, the plurality of rolling elements 106 may comprise cylindrical rollers, needle rollers, tapered rollers, spherical rollers, or the like.

In one embodiment, the bearing 100 may comprise a cage (partially shown in phantom at 108) disposed about the plurality of rolling elements 106. When present, the cage 108 may function to prevent contact between the individual rolling elements of the plurality of rolling elements 106, thereby preventing wear, degradation or binding of the plurality of rolling elements 106.

The inventors have observed that, in operation of the bearing 100, one or more components of the bearing 100 (e.g., inner race 104, outer race 102, plurality of rolling elements 106, cage 108, or the like) may slightly deform due to the forces exerted on the bearing (e.g., Hertzian contact stress resulting from radial and/or thrust loading of the bearing 100). Such deformation increases frictional forces between the components, thus causing less efficient operation of the bearing 100 (e.g., "drag") and/or degradation of the components. The inventors have further observed that, in applications where the bearing 100 is subject to increased stresses, for example, such as aviation or aerospace applications, conventional materials typically utilized to fabricate the bearings (e.g., steel alloys, ceramics, or the like) exhibit a magnitude of deformation and/or degradation that results in premature or frequent failure of the bearing 100.

As such, in one embodiment, at least one or more components of the bearing 100 (e.g., inner race 104, outer race 102, plurality of rolling elements 106, cage 108, or the like) is at least partially fabricated from an aluminum-magnesium-boron ($AlMgB_{14}$, "BAM") containing ceramic matrix composite. The inventors have observed that at least partially fabricating the one or more components of the bearing 100 from the $AlMgB_{14}$ containing ceramic matrix composite advantageously provides resultant fabricated components that exhibit reduced or eliminated deformation and/or degradation that would otherwise result under high stress, thereby providing a bearing that is more efficient and subject to less failures in high stress applications, as compared to a bearing having components fabricated from conventionally utilized materials.

Without being bound by theory, the inventors believe that the physical and/or chemical properties of the $AlMgB_{14}$ containing ceramic matrix composite (e.g., hardness, lubricity, coefficient of thermal expansion, heat tolerance, electrical and/or thermal conductivity, or the like) provide the aforementioned reduction or elimination of the deformation and/or degradation. For example, in one embodiment, the inventors have observed the $AlMgB_{14}$ containing ceramic matrix composite having one or more of the following properties: a hardness ($H_v$) of between 1500 to about 4500 $H_v$, a coefficient of friction of less than about 0.05, or in one embodiment, about 0.02, a hardness ($R_c$) of greater than about 80, a density of about 2.6 to about 3.8 g/cc, a coefficient of expansion, about 6 to about 11 $10^{-6}$/K, and a fracture toughness (K1c) of about 5 to about 15 Mpa√M. The inventors believe that one or more of the aforementioned properties (e.g., the hardness) may be the result of the crystalline structure of the $AlMgB_{14}$, specifically, the high order covalently bonded $B_{14}$ icosahedra structure typically found in boron based crystalline materials.

The composition of the $AlMgB_{14}$ containing ceramic matrix composite may be varied to provide one or more desired properties, for example, such as the properties described above. For example, in one embodiment, a ratio of aluminum, magnesium and boron may be represented by x:y:14 (e.g., $Al_xMg_yB_{14}$), wherein x and y is less than about 1.

In one embodiment, the $AlMgB_{14}$ containing ceramic matrix composite may comprise a metal containing matrix having $AlMgB_{14}$ containing ceramic fibers or particles dispersed throughout the metal containing matrix. The metal containing matrix may comprise any metal, for example, such as at least one of group III elements (scandium (Sc), yttrium (Y), or the like), group IV elements (titanium (Ti), zirconium (Zr), hafnium (Hf), or the like), group V elements (vanadium (V), niobium (Nb), tantalum (Ta), or the like), nitrides thereof, borides thereof, or the like. The amounts of the $AlMgB_{14}$ and the metal containing matrix within the $AlMgB_{14}$ containing ceramic matrix composite may be varied to provide one or more desired properties, for example, such as the properties described above. For example, in one embodiment the metal containing matrix may be present in an amount of up to about 90% or in one embodiment about 30% to 90%, or in one embodiment 40% to 70% of a total weight of the $AlMgB_{14}$ containing ceramic matrix composite In an exemplary embodiment, the metal containing matrix may be a titanium boride ($TiB_2$) matrix. In such an embodiment, the $AlMgB_{14}$ containing ceramic matrix composite would thus comprise a titanium boride ($TiB_2$) matrix having a plurality of $AlMgB_{14}$ containing ceramic particles or fibers dispersed throughout the matrix. When present, a ratio of $AlMgB_{14}$ to titanium boride ($TiB_2$) present in the $AlMgB_{14}$ containing ceramic matrix composite may be any ratio suitable to provide one or more desired properties, for example, such as the properties described above. For example, in one embodiment, a ratio of $AlMgB_{14}$ to $TiB_2$ may be about 1:1.

Components of the bearing 100 not fabricated from the $AlMgB_{14}$ containing ceramic matrix composite described above may be fabricated from any process compatible material suitable to facilitate satisfactory performance of the bearing 100 in accordance with a desired application. For example, one or more components of the bearing 100 may be fabricated from a metal alloy, for example such as stainless steel, a ceramic, for example such as a silicon nitride ($Si_3N_4$), or the like.

The one or more components of the bearing 100 may be fabricated via any process suitable to fabricate the one or more components from the $AlMgB_{14}$ containing ceramic matrix composite and may be dependent on one or more desired physical properties of the fabricated component. For example, in one embodiment, the process may be suitable to fabricate the component to full or near full density (e.g., less than about 5% porosity). Fabricating to full or near full density may maximize one or more of the desired properties described above (e.g., fracture toughness (K1c), hardness ($H_v$), or the like), thereby increasing the ability of the bearing 100 to withstand stresses imposed on the bearing 100 in high stress applications, as compared to bearings fabricated from conventionally utilized materials. Exemplary fabrication techniques may include hot isolation press (HIP), solid state processing (e.g., vacuum hot press (VHP), spark plasma sintering (SPS), or the like), deposition (e.g., laser powder-fed deposition (LAM), plasma vapor deposition (PVD), or the like), direct material laser manufacturing (DMLM), or the like.

The one or more components may be partially or fully fabricated from the $AlMgB_{14}$ containing ceramic matrix composite. For example, referring to FIG. 2, in one embodiment, a rolling element 206 of the plurality of rolling elements (106 in FIG. 1) may be a monolithic part. In such an embodiment, a body 202 of the rolling element 206 is fully fabricated from the $AlMgB_{14}$ containing ceramic matrix composite. Alternatively, in one embodiment, a coating (cladding) 204 of the $AlMgB_{14}$ containing ceramic matrix composite may be disposed on the body 202 of the rolling element 206. In such an embodiment, the body 202 may be fabricated from the $AlMgB_{14}$ containing ceramic matrix composite, or from a different compatible material, for example, a steel alloy, ceramic, or the like.

Referring to FIG. 3, similar to the rolling element 206 of FIG. 2, at least one of the races 306 (inner race 104 and/or outer race 102 described above) may be a monolithic part having a body 302 fully fabricated from the $AlMgB_{14}$ containing ceramic matrix composite and/or a coating (cladding) 304 of the $AlMgB_{14}$ containing ceramic matrix composite disposed on the body 302 of the race 306.

Although shown as a rolling element bearing in the figures, it is to be understood that the bearing may be any type of bearing suitable to provide relative movement between two objects and that may benefit from the teachings provided herein. For example, the bearing may be a plain bearing, jewel bearing, fluid bearing, magnetic bearing, journal bearing, flexure bearing, linear bearings, recirculating bearings, or the like.

Ranges disclosed herein are inclusive and combinable (e.g., ranges of "a hardness ($H_v$) of about 1500 to about 4500", is inclusive of the endpoints and all intermediate values of the ranges of "about 1500 to about 4500," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Thus, embodiments of a bearing have been provided herein. In at least one embodiment, the inventive bearing may advantageously be functional in a wider range of operating conditions (e.g., higher stress loading) as compared to conventionally utilized bearings, thereby providing a bearing having improved functionality in a wider range of applications.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A bearing comprising:
a bearing assembly having an inner race and an outer race; and
a plurality of rolling elements disposed between the inner race and the outer race, wherein at least one of the inner race, the outer race and the plurality of rolling elements is a monolithic part fabricated from an $AlMgB_{14}$ containing ceramic matrix composite.

2. The bearing of claim 1, wherein a ratio of aluminum, magnesium and boron in the $AlMgB_{14}$ containing ceramic matrix composite is represented by x:y:14, wherein x and y is less than about 1.

3. The bearing of claim 1, wherein the $AlMgB_{14}$ containing ceramic matrix composite comprises a metal containing matrix having a plurality of $AlMgB_{14}$ containing particles or fibers dispersed throughout the metal containing matrix.

4. The bearing of claim 3, wherein the metal containing matrix comprises at least one of a group III element, a group IV element, or a group V element.

5. The bearing of claim 3, wherein the AlMgB14 containing ceramic matrix composite comprises the metal containing matrix in an amount of up to about 90% of a total weight of the AlMgB14 containing ceramic matrix composite.

6. The bearing of claim 3, wherein the metal containing matrix comprises titanium diboride (TiB2).

7. The bearing of claim 6, wherein a ratio of AlMgB14 to TiB2 within the AlMgB14 containing ceramic matrix composite may be about 1:1.

8. The bearing of claim 1, wherein the monolithic part has a porosity of less than about 5%.

9. The bearing of claim 1, wherein the ceramic is silicon nitride (Si3N4).

10. The bearing of claim 1, wherein the AlMgB14 containing ceramix matrix composite has a hardness (Hv) of about 1500 to about 4500.

11. The bearing of claim 1, wherein the AlMgB14 containing ceramic matrix composite has coefficient of friction of less than about 0.05.

12. A bearing comprising:
a bearing assembly having an inner race and an outer race; and
a plurality of rolling elements disposed between the inner race and the outer race, wherein at least one of the inner race, the outer race and the plurality of rolling elements is a monolithic part fabricated from an AlMgB14 containing ceramic matrix composite, wherein the AlMgB14 containing ceramic matrix composite comprises a plurality of AlMgB14 containing particles or fibers dispersed throughout a TiB2 containing metal matrix.

13. The bearing of claim 12, wherein a ratio of AlMgB14 to TiB2 within the AlMgB14 containing ceramic matrix composite may be about 1:1.

14. The bearing of claim 12, wherein the AlMgB14 containing ceramic matrix composite comprises the TiB2 containing metal matrix in an amount of up to about 90% of a total weight of the AlMgB14 containing ceramic matrix composite.

15. The bearing of claim 12 wherein the monolithic part has a porosity of less than about 5%.

16. The bearing of claim 12, wherein a ratio of aluminum, magnesium and boron in the AlMgB14 containing ceramic matrix composite is represented by x:y:14, wherein x and y is less than about 1.

17. The bearing of claim 12, wherein the AlMgB14 containing ceramix matrix composite has a hardness (Hv) of about 1500 to about 4500.

18. The bearing of claim 12, wherein the AlMgB14 containing ceramic matrix composite has coefficient of friction of less than about 0.05.

* * * * *